United States Patent Office 3,114,768
Patented Dec. 17, 1963

3,114,768
SYNTHESIS OF POLYCYCLIC ALKANOIC ACID COMPOUNDS
Henry E. Fritz, South Charleston, W. Va., assignor to Union Carbide Corporation, a corporation of New York
No Drawing. Filed Sept. 25, 1961, Ser. No. 140,250
15 Claims. (Cl. 260—515)

This invention relates to a novel process for producing polycyclic alkanoic acid compounds. More particularly, this invention relates to a process for producing indenylalkanoic acids, fluorenylalkanoic acids, the group I alkali metal salts thereof, and the alkyl esters thereof.

The products produced by the process of this invention are polycyclic alkanoic acids and the group I alkali metal salts and alkyl esters thereof, which can be represented by the following formula:

(A)
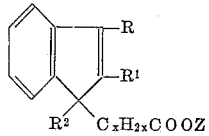

wherein R, when taken singly, is a hydrogen atom or a $-C_xH_{2x}COOZ$ group; $R^1$, when taken singly, is a hydrogen atom; R and $R^1$, when taken together, form a divalent $-CH=CH-CH=CH-$ radical; Z is a hydrogen atom, a group I alkali metal atom, or an alkyl radical having from about 1 to about 20 or more carbon atoms, such as methyl, ethyl, propyl, hexyl, 2-ethylhexyl, 2,2,4-trimethylpentyl, decyl, and the like; $x$ is an integer having a value of from about 1 to about 15 or more, preferably from about 2 to about 6; and $R^2$ is a hydrogen atom or a $-C_xH_{2x}COOZ$ group. Also included are the polycyclic alkanoic acid compounds which contain one or more hydrocarbon substituents on one or more of the ring carbon atoms.

Thus, it can be seen that the products of the process of this invention can be indenylalkanoic acid compounds and fluorenylalkanoic acid compounds. The indenylalkanoic acid compounds can be represented by the formula:

(B)
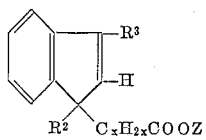

wherein $R^3$ can be a hydrogen atom or a $-C_xH_{2x}COOZ$ group; and $R^2$, $x$, and Z are as previously defined.

The indenylalkanoic acid compounds produced by the process of this invention can be further represented by the following structural formulae:

(C)
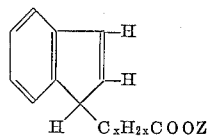

(D)
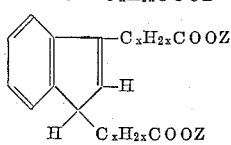

and
(E)
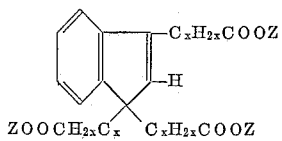

wherein $x$ and Z are as previously defined. As illustrations of the indenylalkanoic acid compounds one can mention 1-indenylacetic acid, 1,3-bis(carboxymethyl)indene, 3-(1-indenyl)-propionic acid, 1,3-bis(carboxyethyl)indene, 1,1,3-tris(carboxyethyl)indene, 4-(1-indenyl)butyric acid, 1,3-bis(carboxypropyl)indene, 5-(1-indenyl)valeric acid, 1,3-bis(carboxybutyl)indene, 6-(1-indenyl)caproic acid, 1,3-bis-(carboxypentyl)indene, 7-(1-indenyl)enanthic acid, 1,3-bis(carboxyhexyl)indene, 8-(1-indenyl)caprylic acid, 1,3-bis(carboxyheptyl)indene, 9-(1-indenyl)pelargonic acid, 1,3-bis(carboxyoctyl)indene, 10-(1-indenyl)capric acid, 1,3-bis(carboxynonyl)indene, lithium 1-indenylacetate, sodium 1-indenylacetate, potassium 1-indenylacetate, rubidium 1-indenylacetate, cesium 1-indenylacetate, lithium 3-(1-indenyl)propionate, sodium 3-(1-indenyl)propionate, potassium 3-(1-indenyl)propionate, rubidium 3-(1-indenyl)propionate, cesium 3-(1-indenyl)propionate, lithium 4-(1-indenyl)valerate, sodium 4-(1-indenyl)valerate, potassium 4-(1-indenyl)valerate, rubidium 4-(1-indenyl)valerate, cesium 4-(1-indenyl)valerate, lithium 7-(1-indenyl)enanthoate, sodium 7-(1-indenyl)enanthoate, potassium 7-(1-indenyl)enanthoate, rubidium 7-(1-indenyl)enanthoate, cesium 7-(1-indenyl)enanthoate, lithium 10-(1-indenyl)caprate, sodium 10-(1-indenyl)caprate, potassium 10-(1-indenyl)caprate, rubidium 10-(1-indenyl)caprate, cesium 10-(1-indenyl)caprate, the dilithium salt of 1,3-bis(carboxymethyl)indene, the disodium salt of 1,3-bis(carboxymethyl)indene, the dipotassium salt of 1,3-bis(carboxymethyl)indene, the dirubidium salt of 1,3-bis(carboxymethyl)indene, the dicesium salt of 1,3-bis(carboxymethyl)indene, the disodium salt of 1,3-bis(carboxypentyl)indene, the dipotassium salt of 1,3-bis(carboxypentyl)indene, the dirubidium salt of 1,3-bis(carboxypentyl)indene, the dicesium salt of 1,3-bis(carboxypentyl)indene, the dilithium salt of 1,3-bis(carboxynonyl)indene, the disodium salt of 1,3-bis(carboxynonyl)indene, the dipotassium salt of 1,3-bis(carboxynonyl)indene, the dirubidium salt of 1,3-bis(carboxynonyl)indene, the dicesium salt of 1,3-bis(carboxynonyl)indene, the trilithium salt of 1,1,3-tris(carboxyethyl)indene, the trisodium salt of 1,1,3-tris(carboxyethyl)indene, the tripotassium salt of 1,1,3-tris(carboxyethyl)indene, the trirubidium salt of 1,1,3-tris(carboxyethyl)indene, the tricesium salt of 1,1,3-tris(carboxyethyl)indene, methyl 3-(1-indenyl)propionate, octyl 3-(1-indenyl)propionate, the dimethyl ester of 1,3-bis(carboxyethyl)indene, the dioctyl ester of 1,3-bis-(carboxyethyl)indene, the trimethyl ester of 1,1,3-tris(carboxyethyl)indene, the trioctyl ester of 1,1,3-tris(carboxyethyl)indene, methyl 10-(1-indenyl)caprate, octyl 10-(1-indenyl)caprate, the dimethyl ester of 1,3-bis(carboxynonyl)indene, the dioctyl ester of 1,3-bis(carboxynonyl)indene, 4-methyl-4-carboxymethyl)indene and its alkali metal salts and alkyl esters, 4-propyl-1-(carboxyethyl)indene and its alkali metal salts and alkyl esters, 4,6-dimethyl-1-(carboxyethyl)indene and its alkali metal salts and alkyl esters, 4-methyl-1,3-bis(carboxyethyl)indene and its dialkali metal salts and dialkyl esters, 4-methyl-1,1,3-tris(carboxyethyl)indene and its trialkali metal salts and trialkyl esters, 3-(2-methyl-1-indenyl)propionic acid, 2-methyl-1,3-bis(carboxyethyl)indene, 2-methyl-1,1,3-tris(carboxyethyl)indene, 3-(2-phenyl-1-indenyl)propionic acid, 2-phenyl-1,3-bis(carboxyethyl)indene, 2-phenyl-1,1,3-tris(carboxyethyl)indene, 3-(3-methyl-1-indenyl)propionic acid, 3-methyl-1,1,1-bis(carboxyethyl)indene, 3-phenyl-1-(carboxyethyl)indene, 3-phenyl-1,1,1-bis-carboxyethylindene, and the like.

The fluorenylalkanoic acid compounds that can be produced by the process of this invention can be represented by the formula:

(F)
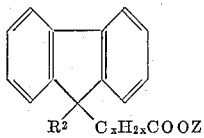

wherein R, x, and Z are as previously defined.

The fluorenylalkanoic acid compounds can be further represented by the formulae:

(G)
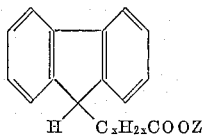

and (H)
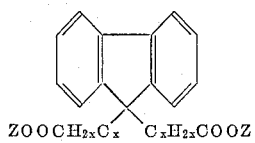

wherein x and Z are as previously defined. As examples of such fluorenylalkanoic acid compounds one can mention 9-fluorenylacetic acid,
3-(9-fluorenyl)propionic acid,
9,9-bis(carboxyethyl)fluorene,
4-(9-fluorenyl)butyric acid,
5-(9-fluorenyl)valeric acid,
6-(9-fluorenyl)caproic acid,
7-(9-fluorenyl(enanthic acid,
8-(9-fluorenyl)caprylic acid,
9-(9-fluorenyl)pelargonic acid,
10-(9-fluorenyl)capric acid,
lithium 9-fluorenylacetate,
sodium 9-fluorenylacetate,
potassium 9-fluorenylacetate,
rubidium 9-fluorenylacetate,
cesium 9-fluorenylacetate,
lithium 4-(9-fluorenyl)butyrate,
sodium 4-(9-fluorenyl(butyrate,
potassium 4-(9-fluorenyl)butyrate,
rubidium 4-(9-fluorenyl)butyrate,
cesium 4-(9-fluorenyl)butyrate,
lithium 7-(9-fluorenyl)enanthoate,
sodium 7-(9-fluorenyl)enanthoate,
potassium 7-(9-fluorenyl)enanthoate,
rubidium 7-(9-fluorenyl)enanthoate,
cesium 7-(9-fluorenyl)enanthoate,
lithium 10-(9-fluorenyl)caprate,
sodium 10-(9-fluorenyl)caprate,
potassium 10-(9-fluorenyl)caprate,
rubidium 10-(9-fluorenyl)caprate,
cesium 10-(9-fluorenyl)caprate, the dilithium salt of 9,9-bis(carboxyethyl)fluorene, the disodium salt of 9,9-bis(carboxyethyl)fluorene, the dipotassium salt of 9,9-bis(carboxyethyl)fluorene, the dirubidium salt of 9,9-bis(carboxyethyl)fluorene, the dicesium salt of 9,9-bis(carboxyethyl)fluorene, methyl 3-(9-fluorenyl)propionate, octyl 3-(9-fluorenyl)propionate, the dimethyl ester of 9,9-bis(carboxyethyl)fluorene, the dioctyl ester of 9,9-bis(carboxyethyl)fluorene, methyl 10-(9-fluorenyl)caproate, octyl 10-(9-fluorenyl)caproate, 2-methyl-9-carboxyethylfluorene and its alkali metal salts and alkyl esters, 2-methyl-9,9-bis(carboxyethyl)fluorene and it dialkali metal salts and alkyl esters, 2,7-dimethyl-9-carboxyethylfluorene and its alkali metal salts and alkyl esters, 2,7-dimethyl-9,9-bis(carboxyethyl)fluorene and its dialkali metal salts and dialkyl esters, and the like.

The compounds produced by the process of this invention are conveniently represented in the free acid form by the following formulae:

(I) Polycyclic alkanoic acids

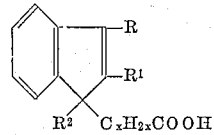

(II) Indenylalkanoic acids

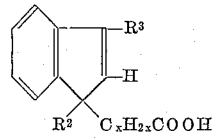

(III) 1-indenylalkanoic acids

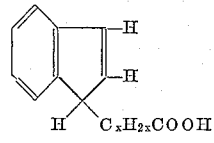

(IV) 1,3-bis(carboxyalkyl)indenes

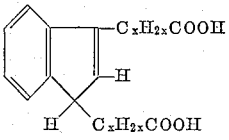

(V) 1,1,3-tris(carboxyalkyl)indenes

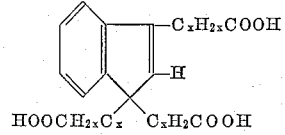

(VI) Fluorenylalkanoic acids

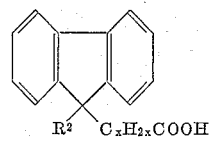

(VII) 9-fluorenylalkanoic acids

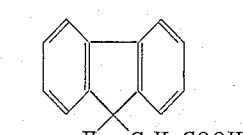

(VIII) 9,9-bis(carboxyalkyl)fluorenes

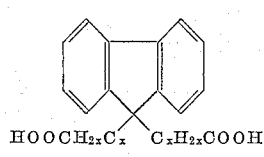

The compounds produced by the process of this invention are useful in themselves as polymerizable monomers for the production of polyesters, and they also can be used to prepare different monomers for the formation of polymeric products. For example, difunctional amino acids can be prepared by the nitration of the free acids or by the condensation of the free acids with acrylonitrile, followed by the reduction of the nitro or nitrile group to an amino group. Hydroxy acids can be produced by diazotization of this amino group. Both the amino acids and the hydroxy acids are useful as monomers for the preparation of polymeric products.

The process of this invention comprises reacting a polycyclic compound represented by the formula:

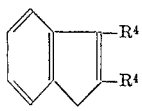

with a carbonyloxy-containing compound, which can be a lactone represented by the formula:

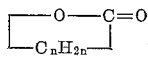

or a hydroxy acid represented by the formula:

$$HOC_xH_{2x}COOH$$

wherein each $R^4$, when taken singly, is a hydrogen atom; and, when taken together, form a divalent $$-CH=CH-CH=CH-$$

radical; $x$ is as previously defined; and $n$ is an integer having a value of 2 to 15 and preferably from 2 to 6. This reaction is carried out in the presence of a strong base.

The polycyclic starting materials are indene and fluorene. Included also are indenes and fluorenes that are substituted on a ring carbon atom with a hydrocarbon radical, provided said polycyclic starting material has a methylene ($-CH_2-$) group. Preferred substituents are alkyl radicals having from 1 to about 8 carbon atoms and aryl radicals having from 6 to about 8 carbon atoms. Illustrative of suitable polycyclic starting materials one can mention indene, fluorene, 2-methylindene, 3-methylindene, 4-methylindene, 5-methylindene, 6-methylindene, 7-methylindene, 4-ethylindene, 2-propylindene, 3-propylindene, 4-propylindene, 5-propylindene, 6-propylindene, 7-propylindene, 2-phenylindene, 3-phenylindene, 4-phenylindene, 5-phenylindene, 6-phenylindene, 7-phenylindene, 2,3-dimethylindene, 1-methylfluorene, 2-methylfluorene, 3-methylfluorene, 4-methylfluorene, 5-methylfluorene, 6-methylfluorene, 7-methylfluorene, 8-methylfluorene, 1-ethylfluorene, 2-ethylfluorene, 3-ethylfluorene, 4-ethylfluorene, 5-ethylfluorene, 6-ethylfluorene, 7-ethylfluorene, 8-ethylfluorene, 1-propylfluorene, 2-propylfluorene, 3-propylfluorene, 4-propylfluorene, 5-propylfluorene, 6-propylfluorene, 7-propylfluorene, 8-propylfluorene, 4,5-dimethylindene, 4-methyl-6-propylindene, 2,4-diethylfluorene, 2,4,5,7-tetraethylfluorene, and the like.

Illustrative of suitable lactones and hydroxy acids which can be employed as starting materials, one can mention propiolactone, butyrolactone, valerolactone, caprolactone, enanthiolactone, caprilactone, pelargolactone, glycolic acid, 3-hydroxypropionic acid, 4-hydroxybutyric acid, 5-hydroxyvaleric acid, 6-hydroxycaproic acid, 7-hydroxyenanthic acid, 8-hydroxycaprilic acid, 9-hydroxypelargonic acid, 10-hydroxycapric acid, and the like.

When the desired primary product is the monocarboxylic acid polycyclic compound, the mole ratio of carbonyloxy-containing compound to polycyclic compound employed in the charge is about 1:1 or less. When a dicarboxylic acid polycyclic compound is desired as the primary product, the preferred mole ratio of carbonyloxy-containing compound to polycyclic compound is about 2:1. When a tricarboxylic indenylalkanoic acid compound is the primary product desired, the mole ratio of carbonyloxy-containing compound to indenyl compound is about 3:1 or more. Mole ratios between 1:1 and 2:1 give mixtures of monocarboxylic acids and dicarboxylic acids with both the indene and fluorene compounds. Mole ratios between 2:1 to 3:1 with the indene compounds give mixtures of dicarboxylic indenylalkanoic acids and tricarboxylic indenylalkanoic acids.

In the process of this invention, a strong base is required to promote the reaction of the polycyclic compound with the carbonyloxy-containing compound. The strong base that is employed is a group I alkali metal hydroxide, such as lithium hydroxide, sodium hydroxide, potassium hydroxide, rubidium hydroxide, and cesium hydroxide, with potassium hydroxide preferred.

Without limiting the invention to specific theories, it is believed that the reaction proceeds in two steps, (1) a reaction of the base with the carbonyloxy-containing compound to form an alkali metal salt of a hydroxy acid, and (2) a reaction of the alkali metal salt of the hydroxy acid with an active methylene group of the polycyclic compound whereby an alkali metal salt of a polycyclic alkanoic acid is produced. Thus, to achieve good yields of polycyclic alkanoic acid compound at least one mole of base must be employed per mole of carbonyloxy-containing compound to promote the reaction. Furthermore, a slight excess of base acts as a catalyst for the reaction. Accordingly, mole ratios of base to carbonyloxy-containing compound of from 1:1 to 2:1 are generally employed, with mole ratios of from 1.1:1 to 1.5:1 preferred. Higher ratios than these can be employed but afford no particular advantages.

The process of this invention is conducted at temperatures of from about 150° C., or lower, to about 350° C., or higher, with from about 200° C. to about 250° C. preferred.

In general, the process of this invention is conducted at atmospheric pressure. Higher and lower pressures can be employed but afford no particular advantages.

The polycyclic alkanoic acid compounds produced by this invention are readily recovered as the alkali metal salts of the corresponding polycyclic alkanoic acid, and are isolated by procedures well known in the art. The corresponding free acids can be produced by acidifying the alkali metal salts, either before or after separation from the reaction mixture, and thereafter recovering the acids by procedures well known in the art.

The free acids, in turn, are readily converted to esters by reacting the free acid with an aliphatic alcohol having from about 1 to about 10 or more carbon atoms, such as methanol, ethanol, isopropanol, 2-ethylhexanol, 2,2,4-trimethylpentanol, decanol, and the like, according to procedures well known to one skilled in the art.

The following examples are illustrative.

*Example I*

There were charged to a 3-liter, stainless steel, rocker autoclave a mixture of 332 grams of fluorene, 340 grams of glycolic acid, and 400 grams of potassium hydroxide. The autoclave was sealed and the mixture was heated to 246° C. over a period of 2 hours and then maintained at 251° C.∓5° C. for 20 hours while agitating by rocking. The grey, solid reaction mixture containing potassium 9-fluorenylacetate was mixed with two liters of water and the resulting slurry was filtered to recover 166 grams of unreacted fluorene. The aqueous filtrate was acidified to a pH of 2 with concentrated hydrochloric acid, whereby a grey solid containing 9-fluorenylacetic acid precipitated. The precipitate was filtered from the acidic mixture and mixed with boiling toluene. The resulting slurry was filtered and the toluene was evaporated from the filtrate at reduced pressure, leaving 9-fluorenylacetic acid which, after recrystallization from cyclohexane, weighed 40 grams and melted at 131–132° C. The melting point of 9-fluorenylacetic acid is reported by Bachmann and Sheenan, JACS, 62, 1687–90 (1940), as 131–132° C. Microanalysis: Calculated for $C_{15}H_{12}O_2$: C, 80.3%; H, 5.4%; found: 80.2%; C, 5.5%. Neutralization equivalent: Theoretical: 224; found: 229. The structure of the 9-fluorenylacetic acid was confirmed by its infrared and ultraviolet spectra.

*Example II*

There was charged to a 3-liter, stainless steel, rocker autoclave 166 grams of fluorene, 150 grams of propiolactone, and 200 grams of potassium hydroxide. The autoclave was sealed and heated to 218° C. over a period of 1 hour and then maintained at 220° C. for 20 hours while agitating by rocking. The white, solid reaction mixture containing the dipotassium salt of 9,9-bis(carboxyethyl)fluorene was added to 1 liter of water and the resulting mixture was extracted 4 times with 500-milliliter portions of isopropyl ether. The ether extracts were combined and evaporated, whereby 121 grams of unreacted fluorene were recovered. The aqueous raffinate was acidified with concentrated hydrochloric acid to a pH of 2, whereupon 9,9-bis(carboxyethyl)fluorene precipitated. The diacid was filtered from the aqueous acidic mixture, washed with water, and dried. There were obtained 70 grams of 9,9-bis(carboxyethyl)fluorene. Recrystallization of the acid from methanol gave white crystals which melted at 282–284° C. (The melting point of 9,9-bis(carboxyethyl)fluorene is reported to be 273–274° C., by H. A. Bruson, JACS, 64, 2457 (1942).) Microanalysis: Calculated for $C_{19}H_{18}O_4$: C, 73.5%; H, 5.9%; found: C, 73.2%; H, 6.1%. Saponification equivalent: Theoretical: 155; found: 153. The structure of the acid was further confirmed by its infrared spectrum.

*Example III*

There were charged to a 3-liter, stainless steel, rocker autoclave 332 grams of fluorene, 190 grams of butyrolactone, and 200 grams of potassium hydroxide. The autoclave was sealed, pressurized to 25 p.s.i.g. with air, heated to 225° C. over a period of one hour, and then maintained at 225° C. for 22 hours while agitating by rocking. The resulting white, solid reaction mixture containing potassium 4-(9-fluorenyl)-butyrate was added to 1 liter of water and the resulting slurry was filtered to recover 171 grams of unreacted fluorene. The aqueous filtrate was acidified to a pH of 1 with concentrated hydrochloric acid, whereupon 4-(9-fluorenyl)butyric acid separated as an oil which slowly crystallized on standing. After filtering the crystals, washing with water, and drying, the 4-(9-fluorenyl)butyric acid weighed 168 grams and melted at 123–132° C.

The methyl ester of 4-(9-fluorenyl)butyric acid was produced by refluxing for 48 hours a mixture of 90 grams of 4-(9-fluorenyl)butyric acid with 500 milliliters of methanol and 5 grams of para-toluenesulfonic acid as a catalyst. The reaction mixture was fractionally distilled and 75 grams of methyl 4-(9-fluorenyl)butyrate was recovered as a fraction boiling at 166 to 170° C. at 0.4 millimeter mercury presure. The methyl ester has a refractive index, $n_D^{20}$, of 1.5927. Microanalysis: Calculated for $C_{18}H_{18}O_2$: C, 81.2%; H, 6.8%; found: C, 81.3%; H, 7.0%. Saponification equivalent: Theoretical: 266; found: 263.

The structures of 4-(9-fluorenyl)butyric acid and methyl 4-(9-fluorenyl)butyrate were further confirmed by their infrared and ultraviolet spectra.

*Example IV*

There were charged to a 3-liter, stainless steel, rocker autoclave, 830 grams of fluorene, 550 grams of valerolactone, and 365 grams of potassium hydroxide. The autoclave was sealed, pressurized to 25 p.s.i.g. with air, heated to 215° C. over a period of 2 hours, and then maintained at 220° C.±5° C. for 19 hours while agitating by rocking. After cooling, the white, solid reaction mixture containing potassium 5-(9-fluorenyl)valerate was added to 2 liters of water. The resulting slurry was filtered to recover 90 grams of unreacted fluorene. The aqueous filtrate was acidified with concentrated hydrochloric acid to a pH of 1, whereupon 5-(9-fluorenyl) valeric acid separated as oil. The oil was extracted with 500 milliliters of a benzene-isopropyl ether mixture containing 50% isopropyl ether. The benzene-isopropyl ether layer was washed with 200 milliliters of 8% aqueous hydrochloric acid and then several times with 200-milliliter portions of water. The isopropyl ether and benzene were evaporated from the water-washed solution, leaving 1110 grams of 5-(9-fluorenyl)valeric acid.

Methyl 5-(9-fluorenyl)valerate was produced by refluxing 300 grams of 5-(9-fluorenyl)valeric acid with 1500 milliliters of methanol and 15 grams of para-toluenesulfonic acid as catalyst for 26 hours. The resulting reaction mixture was washed with water, 10% aqueous sodium hydroxide, and again with water. The washed reaction mixture was fractionally distilled and methyl 5-(9-fluorenyl)valerate was recovered as a fraction boiling at 212° C. at a pressure of 3 millimeters of mercury. The methyl 5-(9-fluorenyl)valerate thus recovered had a refractive index $n_D^{20}$, of 1.5863. Microanalysis: Calculated for $C_{19}H_{20}O_2$: C, 81.4%; H, 7.2%; found: C, 80.8%; H, 7.0%. Saponification equivalent: Theoretical: 280; found: 280.

The trimethylpentyl ester was prepared in a similar manner, except that 2,2,4-trimethylpentanol was used in place of methanol. 2,2,4-trimethylpentyl 5-(9-fluorenyl) valerate was recovered as a fraction boiling at 270° C. at 10 millimeters of mercury. The refractive index, $n_D^{20}$, of the trimethylpentyl ester was 1.5462. Microanalysis: Calculated for $C_{26}H_{34}O_2$: C, 82.5%; H, 9.1%; found: C, 82.5%; H, 8.9%. Saponification equivalent: Theoretical: 378; found: 377.

The structures of the acid and both esters were further confirmed by their infrared and ultraviolet spectra.

*Example V*

There were charged to a 1-liter, stainless steel, rocker autoclave 74.7 grams of fluorene, 63 grams of caprolactone, and 45 grams of potassium hydroxide. The autoclave was sealed, pressurized to 25 p.s.i.g. with air, heated to 225° C. over a period of 1 hour, and then maintained at 225° C.±5° C. for 20 hours, while agitating the mixture by rocking. The maximum pressure in the autoclave was 100 p.s.i.g. After cooling to ambient temperature, the light tan solid containing potassium 6-(9-fluorenyl)caproate was removed from the autoclave and added to 400 milliliters of water. The resulting aqueous mixture was extracted with two 150-milliliter portions of isopropyl ether to remove unreacted fluorene. The aqueous raffinate was acidified with concentrated hydrochloric acid to a pH of 2 and 6-(9-fluorenyl)caproic acid separated as a viscous oil. The 6-(9-fluorenyl)caproic acid was not appreciably soluble in ether or hexane but was readily soluble in alcohols. The yield of 6-(9-fluorenyl) caproic acid was 130 grams.

Methyl 6-(9-fluorenyl)caproate was produced by refluxing approximately 100 grams of 6-(9-fluorenyl)caproic acid with 300 milliliters of methanol and 5 milliliters of concentrated sulfuric acid for 4 hours. The reaction mixture was fractionally distilled and the methyl ester was recovered as a fraction boiling at 195–197° C. at a pressure of 1 millimeter of mercury. The index of refraction, $n_D^{20}$, of the methyl 6-(9-fluorenyl)caproate was 1.5785. The saponification equivalent of the ester was 284; theoretical value is 294. The structure of the ester was confirmed by its infrared and ultraviolet spectra.

In a similar manner 6-(9-fluorenyl)caproic acid or its alkali metal salts or alkyl esters is produced by substituting 6-hydroxycaproic acid for caprolactone.

*Example VI*

There were charged to a 3-liter, stainless steel, rocker autoclave 129 grams of indene, 139 grams of caprolactone and 100 grams of potassium hydroxide. The autoclave was sealed and purged with nitrogen, after which the reaction mixture was heated for 20 hours at 200° C.±2° C. while agitating by rocking. The solid reaction product containing a mixture of potassium 6-(1-indenyl)caproate and the dipotassium salt of 1,3-bis-(carboxypentyl) indene was dissolved in water and filtered to remove traces of solid impurities. The aqueous filtrate was extracted once with 250 milliliters of isopropyl ether to remove any unreacted indene. The aqueous solution was then cooled with 500 grams of ice and acidified with concentrated hydrochloric acid to a pH of 2, whereupon an oil separated which slowly changed to a semi-solid. The semi-solid was separated from the water, dissolved in 500 milliliters of isopropyl ether, and filtered. The ether was evaporated from the filtrate, leaving 191 grams of an oil which was a mixture of 6-(1-indenyl)caproic acid and 1,3-bis(carboxypentyl)indene. The two acids are readily separated by a fractional distillation at reduced pressures.

The 6-(1-indenyl)caproic acid and 1,3-bis(5-carboxypentyl)indene were converted to their methyl esters by refluxing the product obtained above with 500 milliliters of methanol and 5 grams of para-toluenesulfonic acid for 20 hours. The resulting reaction mixture was washed with 1 liter of water and then extracted twice with 250-milliliter portions of isopropyl ether. The ether extracts were combined and then extracted twice with 250-milliliter portions of isopropyl ether. The ether extracts were combined and washed with 100 milliliters of 5% aqueous sodium hydroxide and then with water until the ether solution was neutral. The ether solution was distilled to remove the ether, the residue was fractionally distilled at reduced pressure, and two fractions were obtained. The lower-boiling fraction, which weighed 48 grams, was obtained at 161–188° C. at 0.5±0.1 millimeter of mercury pressure and was redistilled to yield 40 grams of methyl 6-(1-indenyl)caproate, which boiled at 145° C. at 0.45 millimeter of mercury pressure. The index of refraction, $n_D^{20}$, of the methyl 6-(1-indenyl)-caproate was 1.5327. Microanalysis: Calculated for $C_{16}H_{20}O_2$: C, 78.7%; H, 8.3%; found: 78.3%; H, 8.4%. The higher boiling fraction, which weighed 61 grams, was obtained at 188–234° C. and 0.5±0.1 millimeter of mercury pressure and was redistilled to yield 38 grams of the dimethyl ester of 1,3-bis(carboxypentyl)indene, which boiled at 222° C. at 0.47 millimeter of mercury pressure. The index of refraction, $n_D^{20}$, of the dimethyl ester was 1.5250. Microanalysis: Calculated for $C_{23}H_{32}O_4$: C, 74.2%; H, 8.6%; found: C, 74.7%; H, 8.5%.

In a similar manner, 3-(1-indenyl)propionic acid or its alkali metal salts and esters, 1,3-bis(carboxyethyl)indene or its alkali metal salts and esters, or 1,1,3-tris(carboxyethyl)-indene or its alkali metal salts and esters can be produced by substituting propiolactone or 3-hydroxypropionic acid for caprolactone.

What is claimed is:

1. In a process for producing a polycyclic alkanoic acid compound represented in the free acid form by the formula:

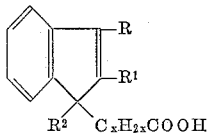

wherein R, when taken alone, is a member selected from the group consisting of a hydrogen atom and a $—C_xH_{2x}COOH$ radical; $R^1$, when taken alone, is a hydrogen atom; R and $R^1$, when taken together, are the divalent $—CH=CH—CH=CH—$ radical; $R^2$ is a member selected from the group consisting of a hydrogen atom and a $—C_xH_{2x}COOH$ radical; and x is an integer having a value of from 1 to 15, the step which comprises heating at a temperature of from 150° C. to 350° C. a mixture of a polycyclic hydrocarbon compound represented by the formula:

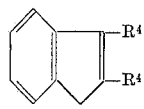

wherein each $R^4$, when taken alone, is a hydrogen atom, and when taken together, are the divalent

radical, a carbonyloxy-containing compound selected from the group consisting of a lactone represented by the formula:

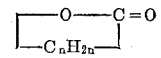

and a hydroxy acid represented by the formula:

$$HOC_xH_{2x}COOH$$

wherein n is an integer having a value from 2 to 15 and x is as previously defined, and at least 1 mole of a group I alkali metal hydroxide per mole of carbonyloxy-containing compound.

2. In a process for producing an indenylalkanoic acid compound represented in the free acid form by the formula:

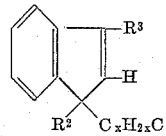

wherein $R^3$ is a member selected from the group consisting of a hydrogen atom and a $—C_xH_{2x}COOH$ radical; $R^2$ is a member selected from the group consisting of a hydrogen atom and a $—C_xH_{2x}COOH$ radical; and x is an integer having a value of from 1 to 15, the step which comprises heating at a temperature of 150° C. to 350° C. a mixture of indene, a carbonyloxy-containing compound selected from the group consisting of a lactone represented by the formula:

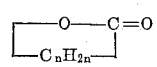

and a hydroxy acid represented by the formula:

$$HOC_xH_{2x}COOH$$

wherein n is an integer having a value of from 2 to 15 and x is as previously defined, and at least 1 mole of a group I alkali metal hydroxide per mole of said carbonyloxy-containing compound.

3. In a process for producing a 1-indenylalkanoic acid compound represented in the free acid form by the formula:

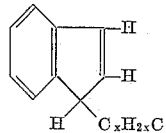

wherein x is an integer having a value of from 1 to 15, the step which comprises heating at 150° C. to 350° C. a mixture of indene, a carbonyloxy-containing compound selected from the group consisting of a lactone represented by the formula:

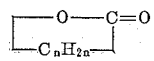

and a hydroxy acid represented by the formula:

$$HOC_xH_{2x}COOH$$

wherein n is an integer having a value of from 2 to 15 and x is as previously defined, and at least 1 mole of a group I alkali metal hydroxide per mole of said carbonyloxy-containing compound.

4. The process for producing a 1-indenylalkanoic acid compound as claimed in claim 3 wherein said carbonyloxy-containing compound is caprolactone.

5. In a process for producing a 1,3-bis(carboxyalkyl)-indene compound represented in the free acid form by the formula:

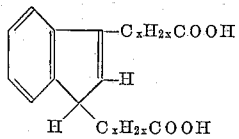

wherein x is an integer having a value of from 1 to 15, the step which comprises heating at 150° C. to 350° C. a mixture of indene, a carbonyloxy-containing compound selected from the group consisting of a lactone represented by the formula:

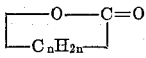

and a hydroxy acid represented by the formula:

$HOC_xH_{2x}COOH$ wherein n is an integer having a value of from 2 to 15 and x is as previously defined, and at least 1 mole of a group I alkali metal hydroxide per mole of said carbonyloxy-containing compound.

6. The process for producing a 1,3-bis(carboxyalkyl)-indene compound as claimed in claim 5 wherein said carbonyloxy-containing compound is caprolactone.

7. In a process for producing a 1,1,3-tris(carboxyalkyl)indene compound represented in the free acid form by the formula:

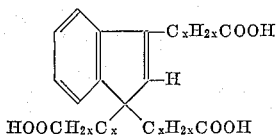

wherein x is an integer having a value of from 1 to 15, the step which comprises heating at 150° C. to 350° C. a mixture of indene, a carbonyloxy-containing compound selected from the group consisting of a lactone represented by the formula:

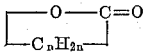

and a hydroxy acid represented by the formula:

$HOC_xH_{2x}COOH$ wherein n is an integer having a value of 2 to 15 and x is as previously defined, and at least 1 mole of a group I alkali metal hydroxide per mole of said carbonyloxy-containing compound.

8. In a process for producing a fluorenylalkanoic acid compound represented in the free acid form by the formula:

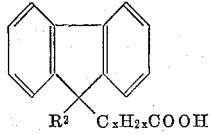

wherein $R^2$ is a member selected from the group consisting of a hydrogen atom and a $—C_xH_{2x}COOH$ radical; and x is an integer having a value of from 1 to 15, the step which comprises heating at 150° C. to 350° C. a mixture of fluorene, a carbonyloxy-containing compound selected from the group consisting of a lactone represented by the formula:

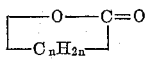

and a hydroxy acid represented by the formula:

$HOC_xH_{2x}COOH$ wherein n is an integer having a value of from 2 to 15 and x is as previously defined, and at least 1 mole of a group I alkali metal hydroxide per mole of said carbonyloxy-containing compound.

9. In a process for producing a 9-fluorenylalkanoic acid compound represented in the free acid form by the formula:

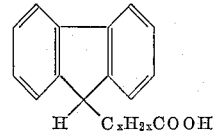

wherein x is an integer having a value of from 1 to 15, the step which comprises heating at 150° C. to 350° C. a mixture of fluorene, a carbonyloxy-containing compound selected from the group consisting of a lactone represented by the formula:

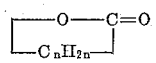

and a hydroxy acid represented by the formula:

$HOC_xH_{2x}COOH$ wherein n is an integer having a value of from 2 to 15 and x is as previously defined, and at least 1 mole of a group I alkali metal hydroxide per mole of said carbonyloxy-containing compound.

10. The process for producing a 9-fluorenylalkanoic acid compound as claimed in claim 9 wherein said carbonyloxy-containing compound is glycolic acid.

11. The process for producing a 9-fluorenylalkanoic acid compound as claimed in claim 9 wherein said carbonyloxy-containing compound is butyrolactone.

12. The process for producing a 9-fluorenylalkanoic acid compound as claimed in claim 9 wherein said carbonyloxy-containing compound is valerolactone.

13. The process for producing a 9-fluorenylalkanoic acid compound as claimed in claim 9 wherein said carbonyloxy-containing compound is caprolactone.

14. In a process for producing a 9,9-bis(carboxyalkyl)-fluorene compound represented in the free acid form by the formula:

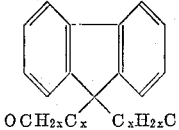

wherein x is an integer having a value of from 1 to 15, the step which comprises heating at 150° C. to 350° C. a mixture of fluorene, a carbonyloxy-containing compound selected from the group consisting of a lactone represented by the formula:

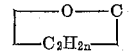

and a hydroxy acid represented by the formula:

$HOC_xH_{2x}COOH$ wherein n is an integer having a value of from 2 to 15 and x is as previously defined, and at least 1 mole of a group I alkali metal hydroxide per mole of said carbonyloxy-containing compound.

15. The process for producing a 9,9-bis(carboxyalkyl)-fluorene compound as claimed in claim 14 wherein said carbonyloxy-containing compound is propiolactone.

References Cited in the file of this patent

UNITED STATES PATENTS

| | | |
|---|---|---|
| 2,280,058 | Bruson | Apr. 21, 1942 |
| 2,301,518 | Bruson | Nov. 10, 1942 |

FOREIGN PATENTS

| | | |
|---|---|---|
| 562,391 | Germany | Nov. 1, 1932 |

OTHER REFERENCES

Rieveschl et al.: "Chem. Rev.," vol. 56, pages 287–389 (1938).